United States Patent
Leyva et al.

(10) Patent No.: US 6,327,405 B1
(45) Date of Patent: Dec. 4, 2001

(54) DEVICES AND METHODS FOR TEMPERATURE STABILIZATION OF BRAGG GRATING STRUCTURES

(75) Inventors: Victor Leyva, Pasadena; Xian-Li Yeh, Walnut; Huey Lu, Alhambra, all of CA (US)

(73) Assignee: Arroyo Optics Inc., Santa Monica, CA (US)

( * ) Notice: Subject to any disclaimer, the term of this patent is extended or adjusted under 35 U.S.C. 154(b) by 0 days.

(21) Appl. No.: 09/518,217

(22) Filed: Mar. 3, 2000

(51) Int. Cl.[7] ............................................ G02B 6/34
(52) U.S. Cl. ........................ 385/37; 385/12; 385/136; 385/137
(58) Field of Search .................... 385/12, 37, 136, 385/137, 42, 43, 95, 96, 99

(56) References Cited

U.S. PATENT DOCUMENTS

| | | | |
|---|---|---|---|
| 5,243,680 | * | 9/1993 | Soane ................................. 385/137 |
| 5,694,503 | * | 12/1997 | Fleming et al. ...................... 385/37 |
| 6,101,301 | * | 8/2000 | Engelberth et al. ................. 385/37 |
| 6,112,553 | * | 9/2000 | Poignant et al. ...................... 65/41 |
| 6,147,341 | * | 11/2000 | Lemaire et al. ................ 250/227.17 |
| 6,181,851 | * | 1/2001 | Pan et al. ............................. 385/37 |

* cited by examiner

Primary Examiner—Rodney Bovernick
Assistant Examiner—Jennifer Doan
(74) Attorney, Agent, or Firm—Jones, Tullar & Cooper, P.C.

(57) ABSTRACT

Precisely tensioned optical fiber devices are held in a temperature compensated package, with a small diameter span of a fiber containing a Bragg grating of a needed periodicity being supported under tension at opposite ends between spaced apart end members whose thermal expansion characteristics differ from that of an underlying base. The direct points of attachment of the ends of the tensioned span are rotationally as well as axially movable, enabling fine tuning of periodicity and twisting to minimize polarization and dispersion effects. This configuration is also useful for unique methods of assembly of the components, and for use during writing the Bragg grating in the small diameter span.

18 Claims, 8 Drawing Sheets

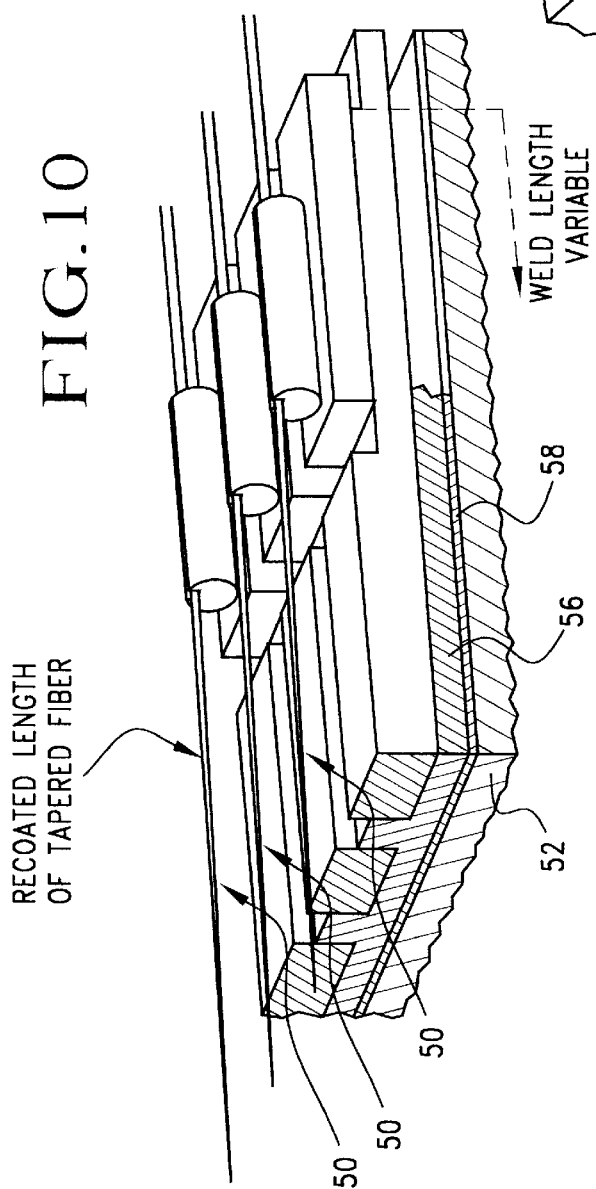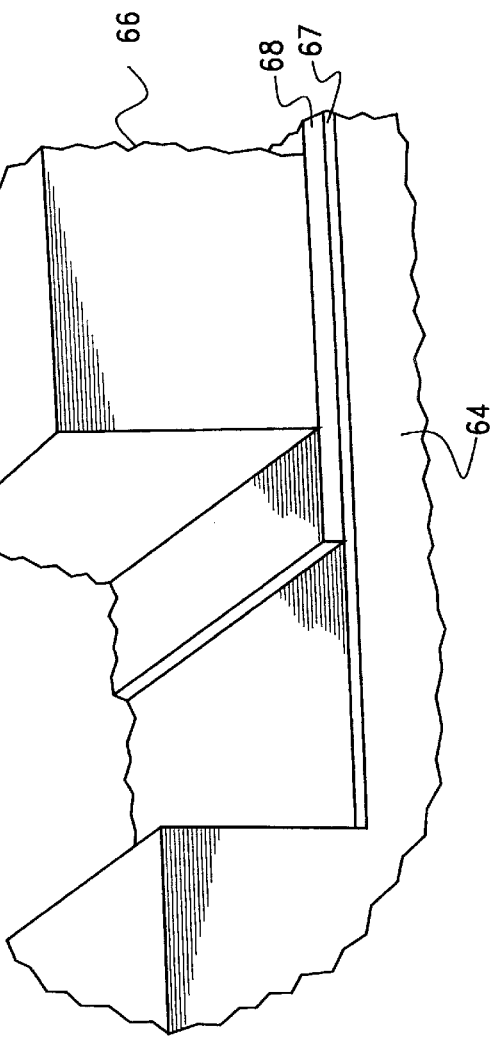

DEVICES AND METHODS FOR TEMPERATURE STABILIZATION OF BRAGG GRATING STRUCTURES

FIELD OF THE INVENTION

This invention relates to temperature stabilization of optical devices and components for optical communications systems, and more particularly to systems and methods for temperature stabilization of Bragg grating structures used in add/drop filter systems and the like.

BACKGROUND OF THE INVENTION

Wideband communication systems using optical signals now commonly employ wavelength division multiplexing (WDM) or dense wavelength division multiplexing (DWDM) to transfer and transmit vast amounts of data at very high data rates. In these multiplexing systems, multiple signal-bearing channels are centered on specified spaced apart wavelengths and sources (e.g. lasers) are set to those wavelengths. Whether combining signals into the multiplex format, or demultiplexing by separating or dropping out signals, the filters and couplers used must have center wavelength stability, with a high degree of precision. This in turn means that temperature variations cannot be permitted to affect operation over a substantial range, such as 0–70° C. For a number of reasons, Bragg grating devices are widely employed in wavelength division multiplex systems because a precise wavelength response can be set by selection of the periodicity of the grating written in a device. Because the periodicity of the grating is affected by temperature, however, due to the temperature coefficient of the waveguide or fiber material, the wavelength selectivity can be unacceptably changed by ambient conditions. For example, without any form of temperature compensation, the center wavelength can vary by as much as +0.01 nm/C. Channel placements and bandwidths for individual signals are such that this amount of variation of length, in a normal temperature environment, would shift the wavelength selectivity such that the coupler or filter is no longer matched to the wavelength of the corresponding laser or other source.

In a prior application, Ser. No. 09/128,476 entitled "Methods of Fabricating Grating Assisted Coupler Devices", filed Aug. 4, 1998 by Anthony S. Kewitsch, et al., and assigned to the assignee of the present invention, this problem is confronted by a disclosed temperature compensation system in which a "prepackage" or support structure is disposed within a cylindrical housing, with the prepackage structure using a number of spaced apart hubs mounted on and/or selectively movable relative to Invar rods. The prepackage structure enables attachment of a span of a fiber-based coupler, and the arrangement provides for the use of thermally dissimilar metal elements (stainless steel) and adjustment means for varying the strain on the critical fiber length which includes a Bragg grating. While this arrangement is fully satisfactory from the operational standpoint, and provides for the needed tensioning of the fiber optic components during the initial writing phase and thereafter despite temperature variations, it is more complex than desirable for high production processes. Further, it is desirable to provide even better temperature compensation, to a level of + or –0.001 nm/° C. center wavelength variation over temperature. In addition, it is desirable to provide means for axial twisting of the fiber optic component, for purposes of achieving polarization independence and reducing polarization mode dispersion (PMD).

SUMMARY OF THE INVENTION

Devices in accordance with the invention suspend the waist region of a fused fiber coupling closely along a base support having a low thermal coefficient of expansion (i.e. Invar or ceramic). The ends of the span are held in spaced apart compensating elements of higher expansion material (e.g. stainless steel) which are attached to the ends of the base support, and have expandable lengths, in relation to their temperature coefficients of expansion, to tend to move the mounting points inwardly to compensate for the thermal expansion of the base support. The net adjustment is arranged to be precisely enough to counteract the effect of temperature on the span. Each end of the span of optical fiber that includes the Bragg grating is mounted in a holder, such as a split-sleeve ferrule, which can be rotated so as to impart a degree of twist to the waist region, compensating for polarization dependence and PMD. This arrangement permits ready assembly of a minimum number of parts and enables fine tuning of both temperature compensation and strain on the suspended span of optical fiber so as to set the desired wavelength selectivity.

Methods of assembling a temperature compensated fused fiber coupler first elongate one or more lengths of optical fibers to form a small diameter waist region. A fused elongated fiber section is mounted under tension between elements that are held on a temporary carrier, to define a span which can be exposed to an illumination pattern, which writes the Bragg grating to provide a selected nominal periodicity. The span is then transferred to the temperature compensated structure, together with the end elements, which can be rotated about the longitudinal axis of the span to reduce polarization dependence and polarization mode dispersion. Then the unit is temperature cycled and the wavelength response of the filter is monitored using a broadband light source and a wavemeter. The temperature compensating structure can be adjusted by varying the relatively expandable lengths of the compensating elements, and the grating periodicity can be fine tuned by incremental shifting of the end elements on their supports.

This arrangement also has the advantage that it facilitates incorporation of a number of temperature compensated couplers in a single housing for assembly of multiplexers and demultiplexers. For this purpose, optical fibers splice together the separate couplers in the desired circuit pattern. The couplers are physically independent, however, being held in the housing in an elastomeric mold which does not introduce any stress that might cause wavelength shifts, or effect the temperature compensation action.

A number of specific features in accordance with the invention contribute to the usefulness of the apparatus and process. In the temperature compensated structure the elongated low expansion base supports spaced apart planar compensating elements which are attached to the base at the ends opposite the intermediate tensioned fiber span. The attachment is advantageously accomplished along a joinder length by laser welding, and the distance between the opposed weld ends (as well as the lengths of the compensating elements that are free to move relative to the base) determine the temperature compensating characteristic. Fine tuning is readily feasible by further precise welding along the joinder line. The mounts for the tensioned fiber spans are in this example cylindrical ferrules with at least one slot for receiving pairs of fibers at one end of the waist region, so that the needed degree of twist can be imprinted by rotation of one or both ferrules about the longitudinal axis of the tensioned span. In addition, micro-adjustments of tension and therefore wavelength sensitivity can be made by laser beam imprints, known as laser "hammering".

The low expansion coefficient base can alternatively be of a non-metallic material such as a ceramic. In this event a conductive coating can be used on end surfaces of the base, so that sheet elements of stainless steel or other metal can be brazed on, to receive separate compensating pads which can then be laser welded.

BRIEF DESCRIPTION OF THE DRAWINGS

A better understanding of the invention may be had by reference to the following description, taken in conjunction with the accompanying drawings, in which:

FIG. 3 is a perspective view of a part of the structure of FIGS. 1 and 2;

FIG. 10 is a fragmentary perspective view, partially broken away, of a position of the unit of FIG. 9; and FIG. 11 is a fragmentary end section view of portions of a temperature compensated unit employing a base of ceramic material.

DETAILED DESCRIPTION OF THE INVENTION

Figure 1:
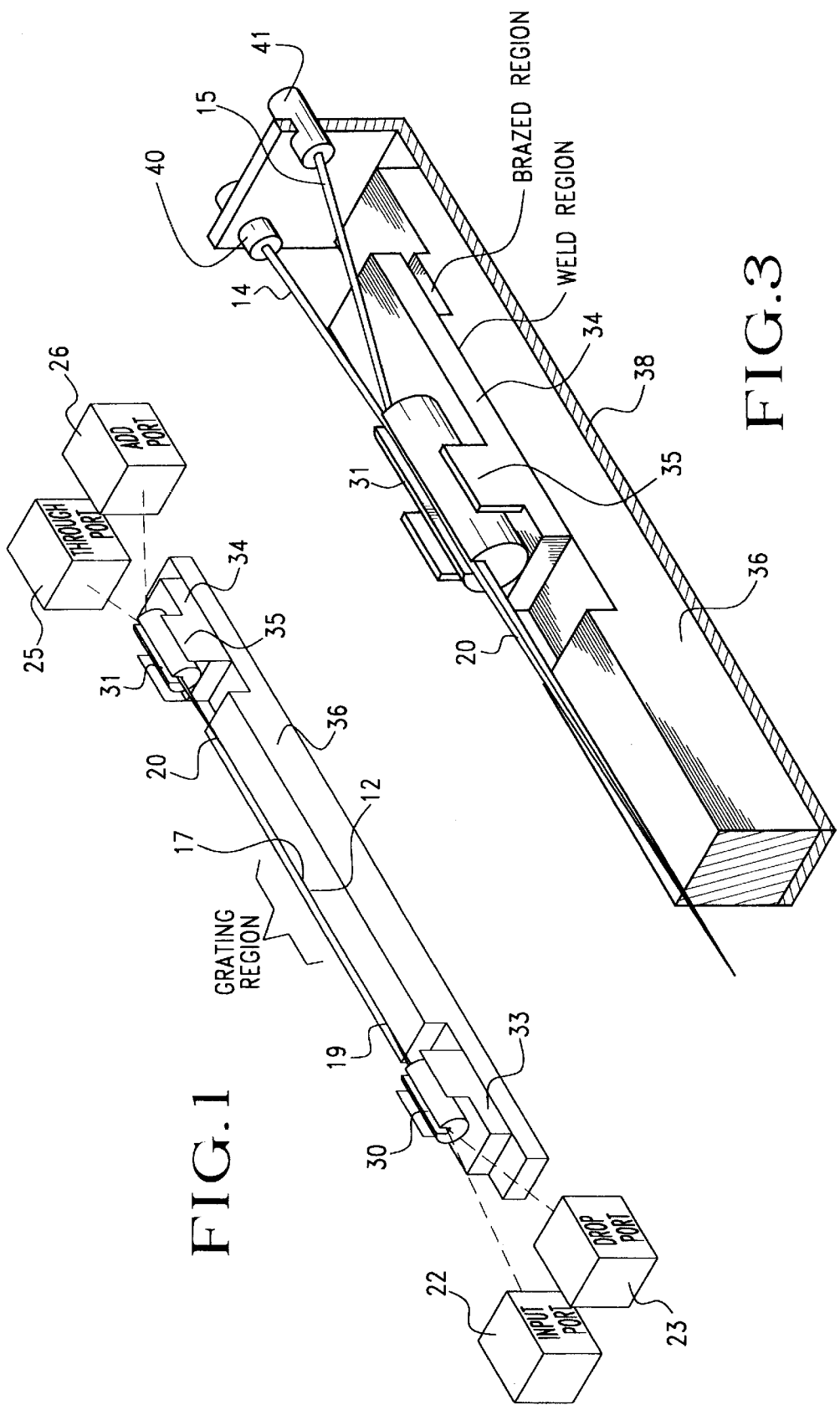
FIG. 1 is a perspective view, partially broken away, of a temperature compensated package for a Bragg grating coupler or filter in accordance with the invention.

Reference should be made to FIGS. 1–4, which depicts a temperature compensated structure for Bragg grating devices. The Bragg grating device 10 that is used as an example here is of the type described in Kewitsch et al U.S. Pat. No. 5,805,751 and includes a small diameter (less than 15 microns) waist region 12 of two longitudinally merged optical fibers 14, 15 including a reflective Bragg grating 17 of a selected nominal periodicity. Given the small diameter the periodicity of the grating varies with the tension on the waist, which in turn, if the span of the waist 12 is held fixed, varies with temperature because of the positive thermal coefficient of expansion of the fibers 14,15. U.S. Pat. No. 5,805,751 further describes how the ends of the waist 12 extend outwardly through pairs of tapered fiber section 19, 20 which diverge in diameter to a standard (e.g. 95–125 micron) optical fiber size.

Figure 2:
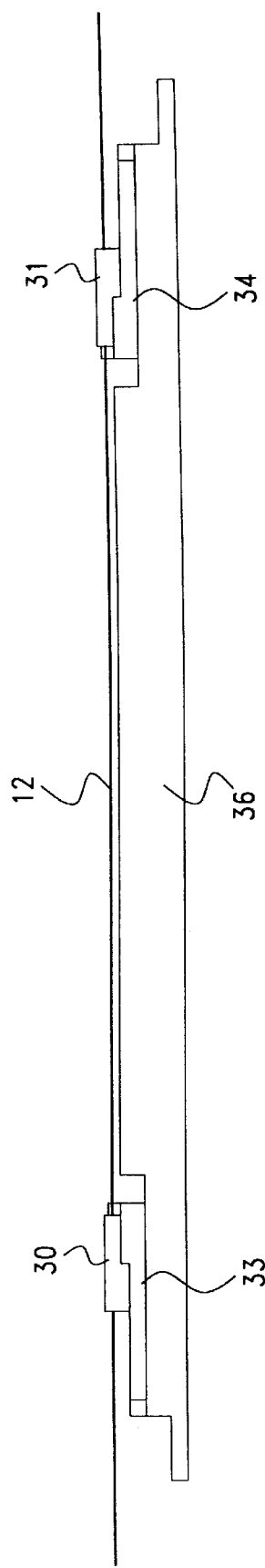
FIG. 2 is a side view of a portion of the arrangement of FIG. 1, showing the disposition of elements of the temperature compensating structure therein.
Figure 4:
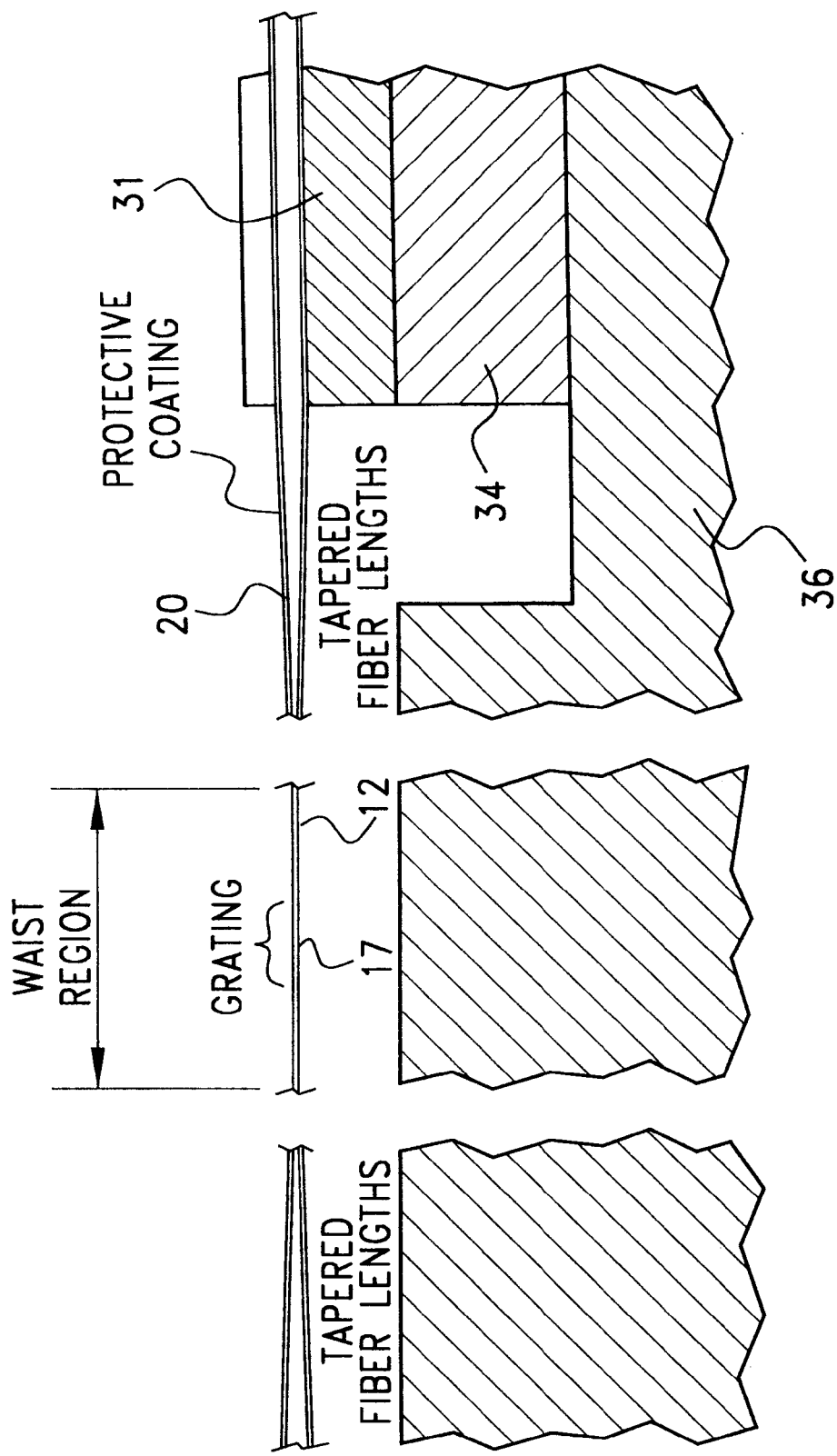
FIG. 4 is an enlarged fragmentary side sectional view of the end portion of a temperature compensated unit of FIGS. 1–3.
Figure 9:
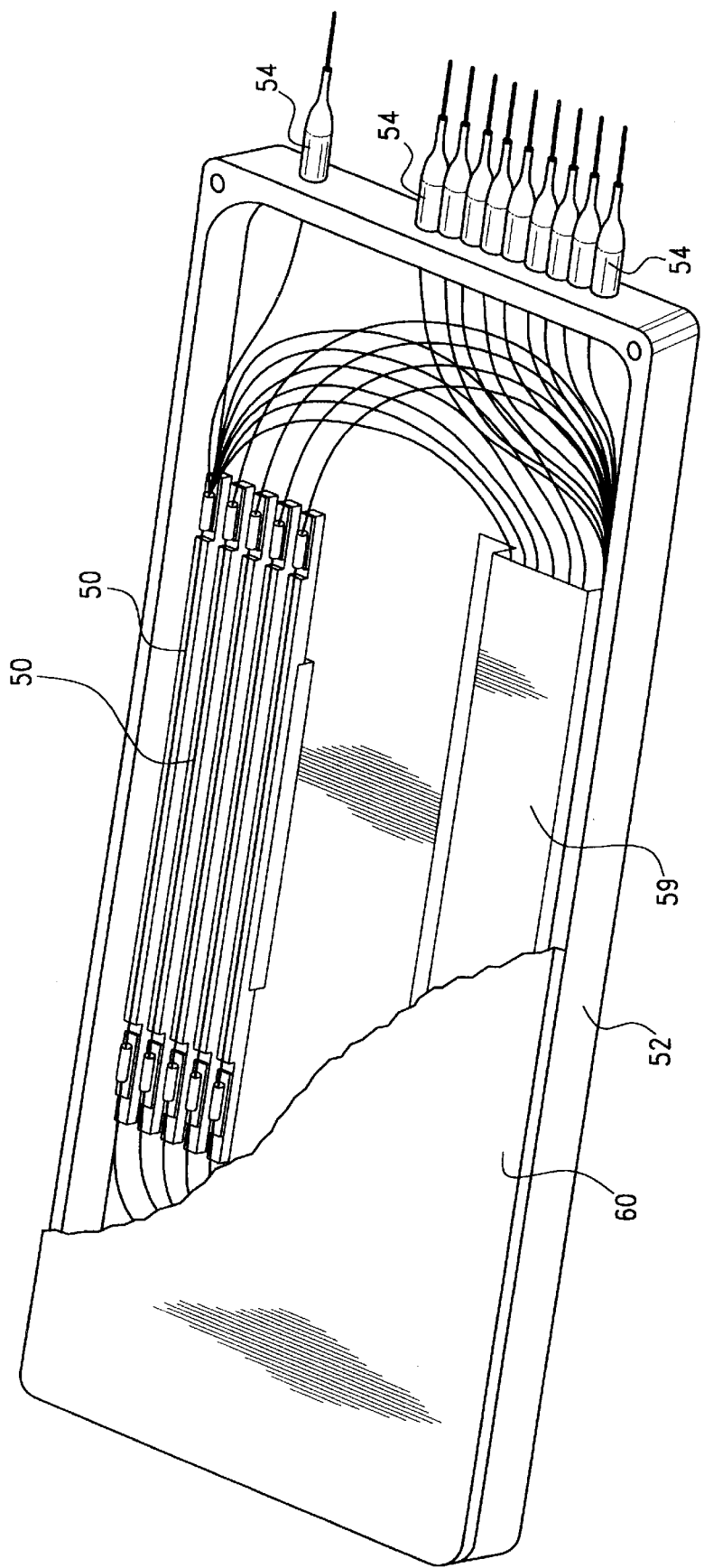
FIG. 9 is a perspective view, partially broken away, of a temperature compensated unit for a number of couplers and/or filters intercoupled in a single housing.

A span of optical fibers that includes the waist 12 and extending tapered sections 19, 20 is formed between end supports, described hereafter. The separate optical fiber couples, as seen particularly in FIG. 1, to an input port or source 22 and drop port 23 on one side of the waist, and a through port 25 and add port 26 on the other. The span is held at each end in cylindrical ferrules 30, 31 of "Kovar" material that are secured on a temperature compensating structure, specifically on separate spaced apart temperature compensating elements 33, 34 in the form of rectangular pads each attached to an opposite end of an elongated base 36. The base 36 has a substantially planar surface close to the level of the planar surface and the ferrules 30, 31 hold the fiber span above the planar surface, as best seen in FIGS. 2 and 4. The entire unit is typically mounted within a sealed housing 38, only a fragment of which is shown in FIG. 3, and the fibers 14, 15 exit the housing through fiber feedthroughs 40, 41 in the end walls of the housing 38. (FIG. 9 depicts a housing construction in greater detail.) The base 36 and compensating elements 33, 34 are of materials having different thermal coefficients of expansion—in this example "Invar 36", a low coefficient material, is used for the base, and 304 Stainless Steel is used for the compensating elements.

The paired fiber ends of the coupler are epoxied in longitudinal slots in each ferrule 30, 31 using a material such as "EpoTek353ND". The epoxy is in contact with bare glass on the inside end of the ferrule 30 or 31, because protective material is removed for elongation, and in contact with the fiber buffer on the outside of the respective ferrule 30 or 31. The ferrules 30, 31 are attached with the fiber under tension to the stainless steel compensating elements 33, 34 using laser welding. Small upstanding panels 35 on the compensating elements provide convenient attachment and reference points for the ferrules. Before attachment the ferrules 30, 31 with the fiber span attached are rotated a number of times (for example ten) in order to minimize the polarization sensitivity of the device. The compensating elements 33, 34 are attached at the outer ends to the base 36 with laser welding, providing facing lengths of compensating metal that are free to move toward each other in opposite directions to expansion of the base 36. The length of the base is 4.9" while the compensating elements are 0.75" in length in this practical example. The optimal weld position between the compensating elements 33, 34 and the base 36 was found to be approximately 0.145" from the outer end, but as described below, the final position is determined by monitoring temperature-induced deviations under test conditions.

These coupler grating filters are 2×2 fused fiber couplers in which the Bragg grating 17 is written in the tapered down fused waist 12 of the coupler. When the fiber is under tension, the change in wavelength of the filter, $\Delta\lambda$, as the temperature varies by $\Delta T$, is given by:

$$\Delta\lambda/\lambda=(\alpha+\zeta)\Delta T+(1-p)\Delta\epsilon \qquad (\text{equ 1})$$

where $\alpha$ is the thermal expansion coefficient of the fiber, $\zeta$ is the thermooptic coefficient, $\Delta\epsilon$ is the change in strain, and $p$ is the photoelastic constant. As the temperature is increased, a negative value of strain can cancel the first term leading to no wavelength shift of the filter. The strain on tapered fibers is non uniform and varies inversely with the cross sectional area. The strain is mainly concentrated in the narrow tapered regions.

Figure 7:
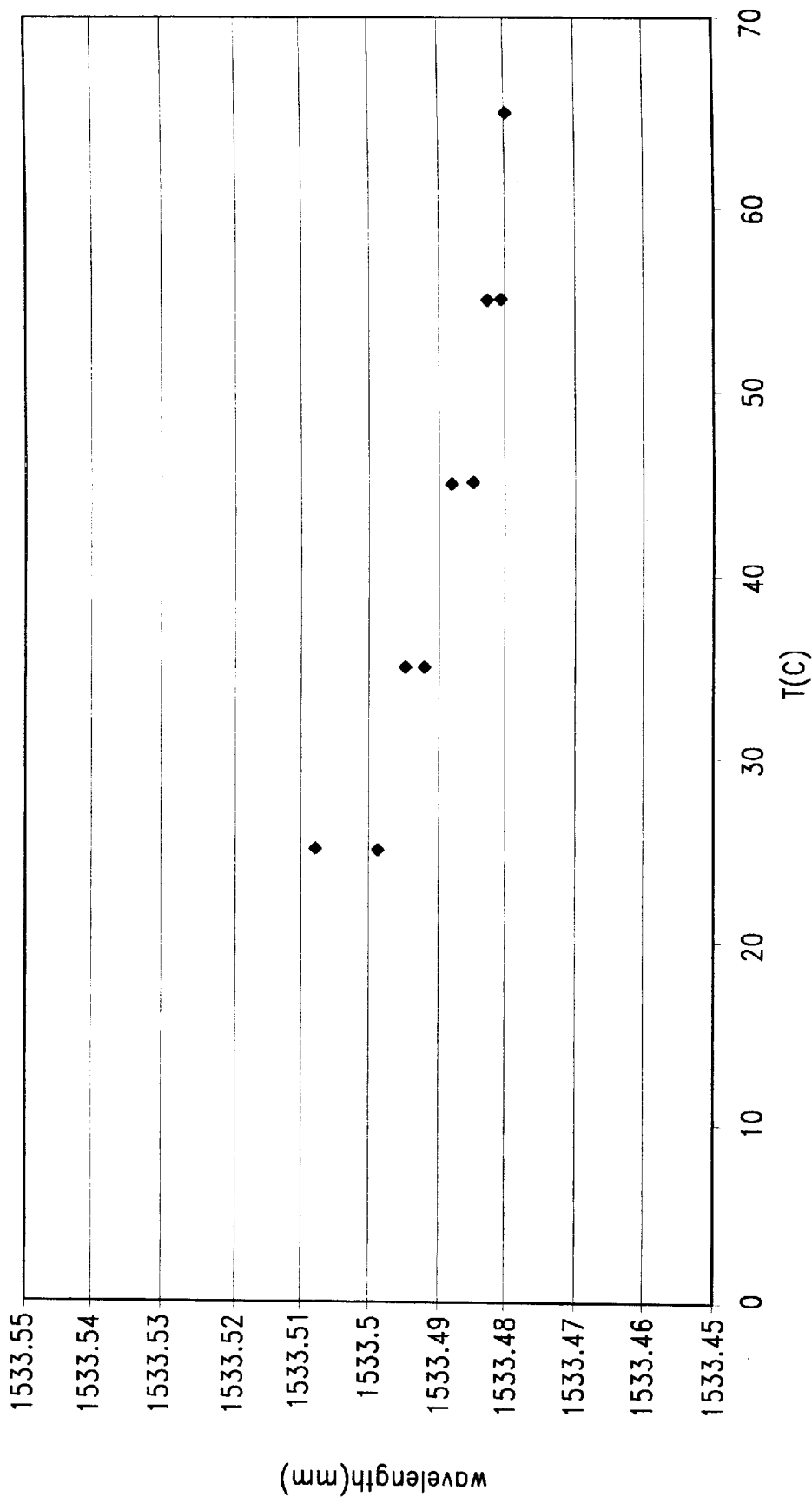
FIG. 7 is a graph of variations in wavelength response in relation to temperature for a temperature compensated package in accordance with the invention.

Various combinations of two materials with different positive thermal expansion coefficients can be used to give the required negative thermal expansion package, but it is convenient to use laser welding to control the precise points of attachment. The compensating elements 33, 34 have facing cantilevered ends which are free to translate relative to the base 36. As the temperature is increased the compensating elements 33, 34 expand inwardly faster than the base 36 expands outwardly. This results in the ferrules 30, 31 moving toward each other, giving a negative thermal expansion coefficient for the assembly. The temperature compensation depends on the location of the welds i.e. the distance between the weld points which are closest and the free lengths of the compensating elements 33, 34. The center wavelength depends on the tension of the waist 12 determined by the spacing between the ferrules 30, 31. Even after the elements are attached laser welding can effect slight tuning of both of these parameters. After testing under temperature cycling conditions the juncture between the elements 33, 34 and the base 36 can be correctively welded to adjust the temperature compensation range. Laser hammering, a process which induces small positional shifts during a weld operation, can also be used to shift the ferrules 30, 31 minutely to selectively tune the center wavelength of the filter. FIG. 7 demonstrates the small wavelength shift of a filter packaged in an example of a temperature compensated package.

Figure 5:
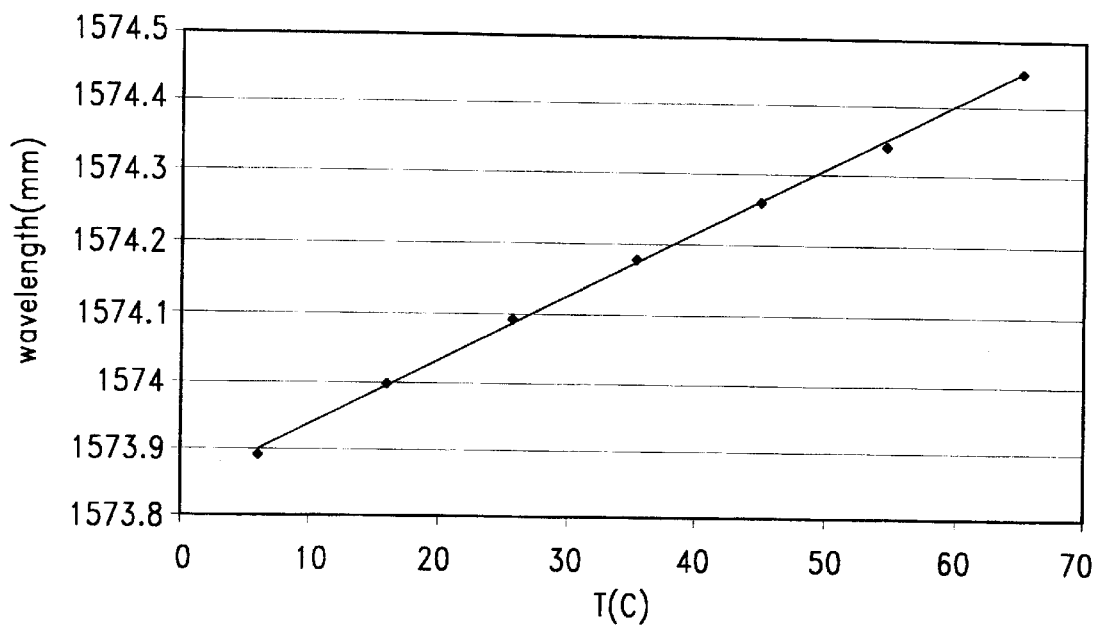
FIG. 5 is a graph of wavelength response in nanometers versus temperature variations in degrees C for a Bragg grating device that is to be temperature compensated.
Figure 6:
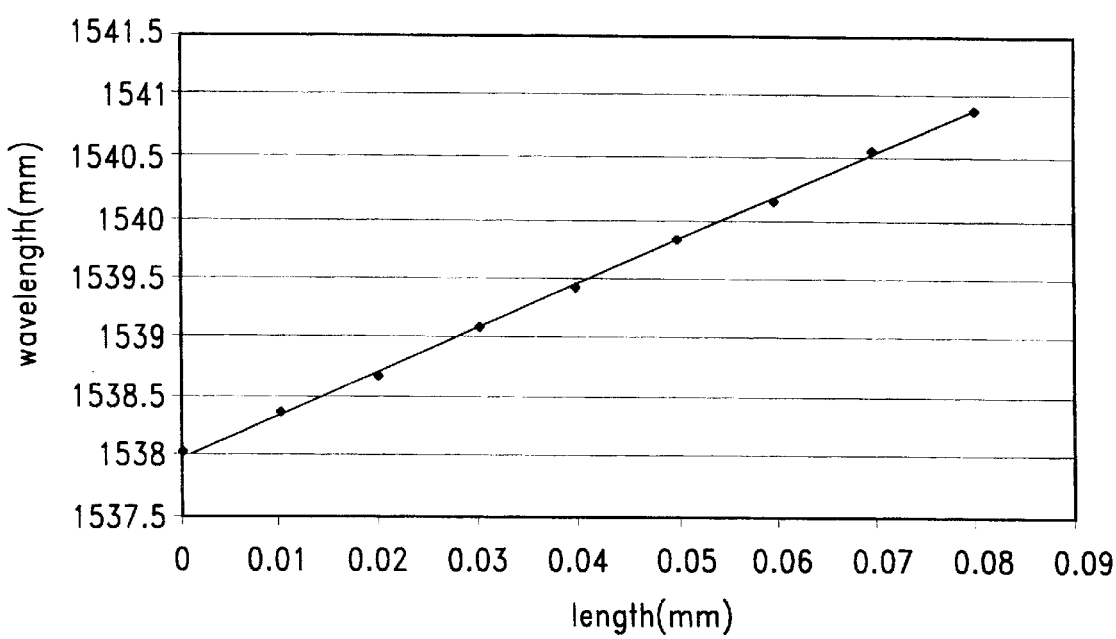
FIG. 6 is a graph of variations in wavelength response versus length for a Bragg grating device.

FIG. 5 shows the change in wavelength of a coupler grating mounted on a non temperature compensated "Invar" package as the temperature is varied. Typical values are +0.01 nm/C. Because "Invar" has a small expansion coefficient the variation is mainly due to the first term in (1). FIG. 6 shows the change in wavelength of a filter as it is stretched. Typical tuning values are +0.036 nm/micron. If the tension of the fiber is decreased as the temperature is increased the filter will be temperature compensated and not change wavelength. The practical requirements for temperature compensation dictate a package with a typical negative thermal expansion of $-(+0.01 \text{ nm/C.})/(0.036 \text{ nm/um}) = -0.278$ micron/C. These goals are met in a practical device in accordance with the invention, as shown in FIG. 7, the measured plot of wavelength vs. temperature for two different measurements.

Figure 8:
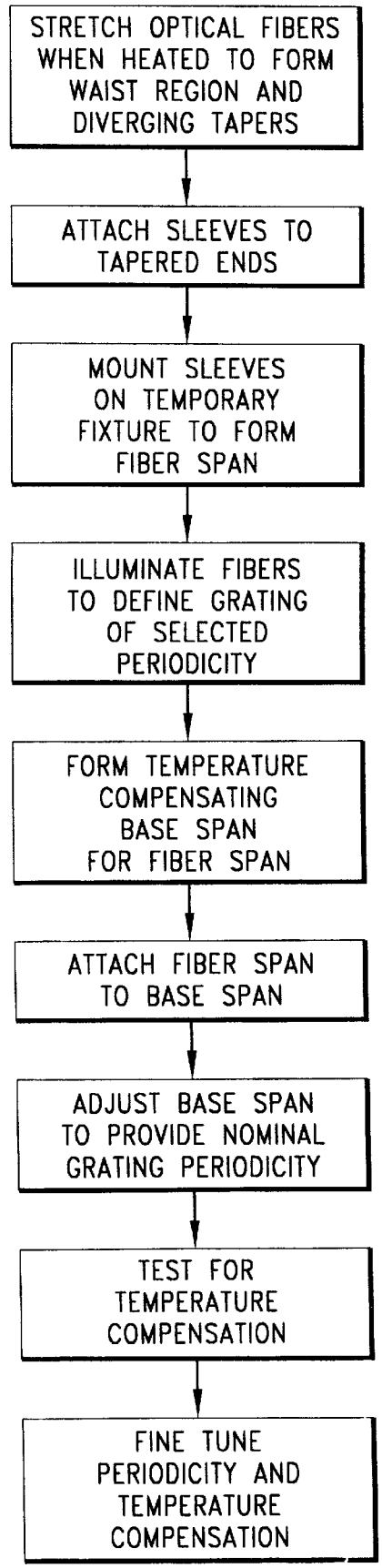
FIG. 8 is a flow chart showing steps that may be employed in assembling and packaging a temperature compensated Bragg grating device.

Methods in accordance with the invention, referring now to FIG. 8, first form the waist region of a fiber coupler by stretching two merged fibers of photosensitized material to a small diameter cross section, from which the tapered lengths extend outwardly in opposite directions. The tapered ends are seated in retainers (such as ferrules) which are then mounted on a temporary fixture which holds the waist region in a tensioned span. A Bragg grating is written by patterned illumination of the photosensitive waist region. This imparts a nominal periodicity to the Bragg grating, which must be both precisely tuned and temperatures compensated. The span supports and the narrowed coupler base between them are then ready to be transferred to a temperature compensating base. This is preliminarily prepared by attaching two compensating elements at spaced apart positions on an elongated base, with predetermined approximate spacings between them. The relatively shorter compensating elements have free lengths which counteract expansion of the longer but lower thermal expansion base. The span supports are mounted on these free ends, with span tension adjusted to a nominal periodicity, for a selected wavelength response. Measuring the wavelength response at different temperature levels, the physical geometry of the base and compensating elements can be changed to center the temperature compensation. Finally, the span supports can be finely adjusted relative to the compensating elements, as by laser hammering on the supports.

To construct a demultiplexer, a number of the temperature compensated filter elements 50 are placed in an aluminum tray 52 (FIGS. 9 and 10). Fiber feedthroughs 54 with strain relief boots (not shown in detail) are used to couple fiber through the walls of the tray 52. The filter elements 50 are placed in grooves in a ribbed silicone mold 56 (best seen in FIG. 10) and attached with RTV or similar adhesive. The devices 50 are spliced together and to the appropriate output fibers by optical fiber loops. A cover or lid 60 is sealed to the tray 52 is sealed in a dry nitrogen atmosphere using epoxy which forms a water tight seal.

The multiple temperature compensated coupler grating filters 50 are conveniently and compactly mounted in substantial parallelism inside of the support tray 52. The ribbed silicone mold 52 holds the filters 50 without applying stress, which could cause wavelength shifts. It also allows for the free expansion of the materials over the temperature range necessary for temperature compensation and provides cushioning from shock and vibration. The tray 52, including the conforming lid 60, is sealed with epoxy to provide a watertight seal.

As shown in FIG. 10, any bare fiber regions, particularly the tapered lengths, up to but not including the waist region can be recoated by using a UV curable acrylate coating such as "Desolite 950" from DSM Desotech Corporation. This helps protect the fiber from any mechanical or environmental damage. The filter elements 50 can be additionally protected from vibrational damage by placing a viscoelastic damping material 68 such as is supplied by Sorbethane Corporation underneath the silicone molds 56, an internal cover 59, only one of which is shown, can be placed over the sets of filters 50 for further protection.

Another example of temperature compensated package is one which uses a base of low expansion ceramic glass such as is available from Nippon Electric and Glass (NEG) instead an "Invar" or other metal base. As shown in FIG. 11, the ceramic base 64 is metallized on the ends which receive compensation elements 66 using an AuSn layer 67. This allows stainless steel sheet metal pieces 68 to be brazed to each end of the base 62 in this region, so that the compensating elements 66 can then welded to the stainless pieces 68.

Although various forms and modifications have been described above and illustrated in the drawings, the invention is not limited thereto but encompasses all alternatives and variations within the scope of the appended claims.

We claim:

1. A temperature compensated fiber optic device comprising:

at least one length of extended, small diameter optical fiber having a periodic index of refraction variation in a section therein, the periodicity of the variation determining the wavelength sensitivity of the device;

a mount structure disposed to suspend the index of refraction section in a tensioned span, the mount structure including a base having a first thermal coefficient of expansion and a pair of spaced apart elements of a different, second thermal coefficient of expansion coupled to the base, the spacings and materials being selected with respect to the length and thermal coefficient of expansion of the span of fiber to maintain the periodicity of the index of refraction variation of the optical fiber substantially constant over the range of ambient temperatures to which the device is exposed; and a pair of end support elements, each mounted on a different one of the elements and each coupled to a different end of the span of the at least one fiber, and at least one being configured to provide axial adjustment of the length of the span through less than a full period of the variation, for fine tuning the periodicity of the index of refraction variation.

2. A fiber optic device as set forth in claim 1 above, wherein the base comprises an elongated element of low coefficient of expansion chosen from the class comprising ceramic and Invar and having a planar surface on a mounting side along its principal length, the spaced apart elements comprise metallic elements of higher thermal coefficient of expansion than the base and having planar surfaces on the mounting side that are substantially parallel to the planar surface on the base, and the coupling elements comprise cylindrical elements and the at least one fiber is longitudinally coupled thereto.

3. A fiber optic device as set forth in claim 1 above, wherein the device is configured to maintain temperature stability in wavelength response to less than 0.001 nm/° C. over a temperature range of about 0° C. to 70° C.

4. A fiber optic device as set forth in claim 1 above, wherein the fiber optic device comprises a coupler having a pair of fibers configured with a longitudinally merged central waist region of small diameter and separate transition lengths of fiber at each end, and wherein the end support elements each receive the transition lengths thereat, and are angularly oriented with respect to the fiber length to establish twist in the waist region of the device.

5. A fiber optic device as set forth in claim 4 above, wherein the waist region has less than a 10 micron diameter and the index of refraction variation defines a Bragg grating, and wherein the tensioned span is disposed along a longitudinal axis and the end support elements are cylindrical elements concentric with the longitudinal axis.

6. A fiber optic device as set forth in claim 5 above, wherein the cylindrical end support elements have longitudinal slots along the sides thereof, wherein the transition lengths of the fibers are diverging tapers from the waist region that are seated in the side slots.

7. A fiber optic device as set forth in claim 1 above, wherein the base is of Invar material and the elements are of stainless steel material having lengths of mating surfaces engaging the pad, and wherein the device further includes laser welds joining the pads to the base, the longitudinal placements of the welds along the direction of the tensioned span being selected to determine the lengths of pads that vary in length, in response to temperature, along the direction of the tensioned span in relation to the temperature variations in length of the base along the same direction.

8. A fiber optic device as set forth in claim 1 above, wherein the base is of ceramic material and wherein the device further includes planar surfaces at each end of the base, conductive material disposed on at least part of the planar surface, and metal support elements affixed to the planar surfaces.

9. A fiber optic device for directing multi-wavelength optical input signals to a throughput port and directing only narrow band optical signals centered on a selected wavelength within the multi-wavelength band to a drop port, comprising:

a fiber optic coupler comprising a pair of optical fibers having a merged, small diameter waist section including a Bragg grating and pairs of tapered transition lengths extending therefrom, the periodicity of the grating determining the selected wavelength and the coupler being disposed along a longitudinal axis;

a mounting structure supporting the coupler in a tensioned span, the mounting structure including a base extending along the longitudinal axis and first and second mounting pads attached thereto at spaced apart regions along the longitudinal axis, the mounting pads having a greater thermal coefficient of expansion than the base and facing end portions free to respond to thermal expansion effects relative to the base, the length and spacing of the end portions being selected relative to the different thermal coefficient of the expansion of the base and the thermal coefficient of expansion of the pair of optical fibers to compensate for temperature-induced variations in the waist section; and first and second end mounts disposed on the facing end portions of the first and second pads respectively and coupled to the ends of the fiber optic coupler thereat.

10. A devise as set forth in claim 9 above, wherein the end mounts are each coupled to both the transition lengths of the coupler at that side of the waist region, and configured for disposition at an arbitrary rotational orientation relative to the longitudinal axis, such that the waist region can have a selected twist imparted thereto.

11. A device as set forth in claim 10 above, wherein the base is of Invar material and the mounting pads are of stainless steel, and the longitudinal relatively expandable lengths of the facing end portions are determined by the longitudinal position of attachments to the base, and wherein the end mounts comprise cylindrical ferrules secured to the pads in alignment with the longitudinal axis.

12. A multiple optical signal device for differentially separating or combining at least two optical signals of different wavelengths with substantially constant wavelength responses despite temperature variations comprising:

a number of optical signal responsive elements each having an index of refraction grating in a tensionable length of small cross-section extending along a longitudinal axis;

a number of temperature responsive supports for the elements, each comprising an elongated base, a pair of mounting pads mounted in spaced apart relation on the base along the longitudinal axis, and end mount elements coupling opposite ends of the elements to the different pads, the base and pads having different thermal coefficients of expansion and arranged with a net negative thermal coefficient for the supports canceling the coefficient of expansion of the signal responsive elements; and an underlying structure including a housing for retaining the supports in parallel relation, the underlying structure comprising an elastomeric material having elasticity which isolates the supports from each other without introducing stress while cushioning the supports against shock.

13. A device as set forth in claim 12 above, wherein the elastomeric material comprises a silicone mold, and wherein the device further includes RTV affixing the elements to the silicone mold and damping material between the underlying structure and the housing.

14. The method of providing a temperature compensated fiber optic device having a Bragg grating intended to have a selected wavelength responsiveness comprising the steps of:

forming an optical fiber device having a narrowed section of less than about 10 microns in diameter and a positive temperature coefficient of expansion;

holding a span of the fiber device including the narrowed section between end points on a temporary support while maintaining a nominal tension on the section;

recording a Bragg grating in the narrowed section while in the temporary support, the grating having a selected first periodicity;

preparing a temperature compensated support having a negative temperature coefficient of expansion between spaced apart first and second regions;

transferring the span including the narrowed section to the temperature compensated support while securing the span to the first and second regions to establish a nominal periodicity in the grating;

subjecting the support and the span to temperature variations while measuring the wavelength responsiveness of the grating;

adjusting the temperature compensated support to minimize variations in wavelength responsiveness with temperature; and adjusting the wavelength responsiveness of the Bragg grating by varying the tension in the span.

15. A method as set forth in claim 14 above, wherein the step of minimizing variations in wavelength responsiveness with temperature comprises the step of varying the negative temperature coefficient of expansion and wherein the step of varying the tension on the span comprises masking micro adjustments of the length of the span.

16. A method as set forth in claim 15 above, wherein the fiber optic device comprises an add/drop filter having longitudinally merged narrow diameter fibers in the narrowest section and tapered transition sections defining the span of the device, and wherein the temperature compensated support comprises a base of a first material extending along the fiber device and end supports spaced apart at the ends of the span and having end lengths expandable with temperature toward each other, the ends of the span being mounted in supports on the end lengths and the method comprising the steps of varying the negative coefficient of temperature coefficient of expansion by changing the end lengths, and varying the tension by laser hammering the end support relative to the end lengths.

17. A temperature compensated assembly of a plurality of fiber optic devices of the type having a temperature-sensitive length of small diameter fibers in a tensioned span, comprising:

a plurality of elongated independent fiber span supports, each having a base substantially parallel to and extending along the span and a pair of spaced apart terminal structures attached to the span ends, the base and terminal structures having lengths and thermal coefficients together compensating for thermal expansion variations of the span;

a housing body for holding the fiber span supports;

elastomeric material within the housing body for retaining the fiber span supports within the body independently and unrestrained in spaced apart locations; and a cover attached to the housing body in sealing relation.

18. An assembly as set forth in claim 17 above, wherein the elastomeric material comprises molded silicone about the bases of the fiber span supports and attached thereto with RTV, and wherein the assembly further includes viscoelastic damping material supporting the molded material in the housing.

* * * * *